United States Patent [19]

Matta et al.

[11] Patent Number: 4,922,712
[45] Date of Patent: May 8, 1990

[54] THRUST REVERSER FOR HIGH BYPASS TURBOFAN ENGINE

[75] Inventors: Ram K. Matta, Loveland; Pupinder K. Bhutiani, Cincinnati, both of Ohio

[73] Assignee: General Electric Company, Cincinnati, Ohio

[21] Appl. No.: 173,800

[22] Filed: Mar. 28, 1988

[51] Int. Cl.$^5$ ............................................. F02K 1/70
[52] U.S. Cl. .................................... 60/226.2; 60/230; 239/265.29
[58] Field of Search ....................... 60/226.2, 230, 229; 239/265.27, 265.29, 265.31, 265.37; 244/110 B, 12.5

[56] References Cited

U.S. PATENT DOCUMENTS

| | | |
|---|---|---|
| 3,172,256 | 3/1965 | Kerry et al. |
| 3,262,268 | 7/1966 | Beavers ................................. 60/230 |
| 3,279,182 | 10/1966 | Helmintoller . |
| 3,475,913 | 11/1969 | Mortlock et al. |
| 3,483,702 | 12/1969 | Ward . |
| 3,603,090 | 9/1971 | Billinger et al. |
| 3,612,401 | 10/1971 | Ellis et al. |
| 3,764,096 | 10/1973 | Wright . |
| 4,030,291 | 6/1977 | Sargisson . |
| 4,177,639 | 12/1979 | Taylor ............................. 239/265.31 |
| 4,485,970 | 12/1984 | Fournier et al. .................... 60/226.2 |

FOREIGN PATENT DOCUMENTS 1276265 6/1972 United Kingdom ........... 239/265.29

Primary Examiner—Donald E. Stout
Attorney, Agent, or Firm—Jerome C. Squillaro; Nathan D. Herkamp

[57] ABSTRACT

A thrust reverser including a bypass duct and a plurality of light weight, circumferentially displaced blocker doors each movable between a normal position and a thrust reversal portion. The blocker doors include pits on the inner portion which faces the bypass duct during normal operation of the engine. Provision is made for automatically covering the pits during normal operation to provide smooth, non-turbulent flow of air through the bypass duct. In one embodiment of this invention a pit cover is pivotally mounted on the blocker door and is biased to engage the edge of a ramp fairing when the blocker door is in the position it occupies during normal operation of the engine. During thrust reversal, the pit cover moves outwardly along with the blocker door and away from the ramp fairing so as not to impede in any way flow of thrust reversal air through an opening in the outer wall. In a modified form of the invention, the ramp fairing is constructed so as to be movable between an extended position wherein it covers the pit curing normal operation of the engine and a retracted position wherein it does not impede the flow of air through the opening in the outer wall during thrust reversal operation.

12 Claims, 4 Drawing Sheets

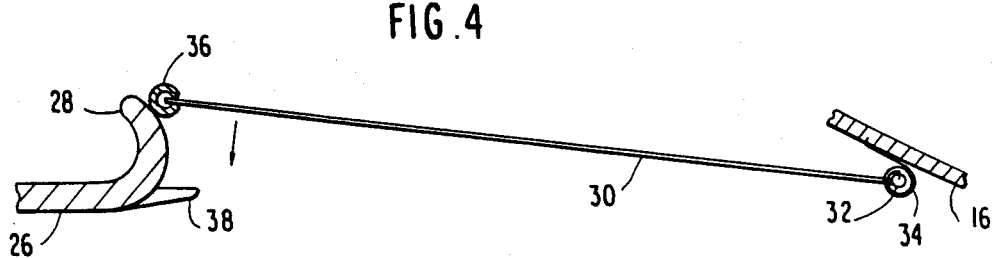
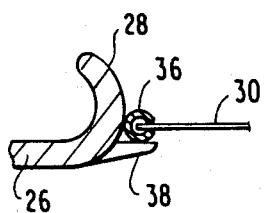
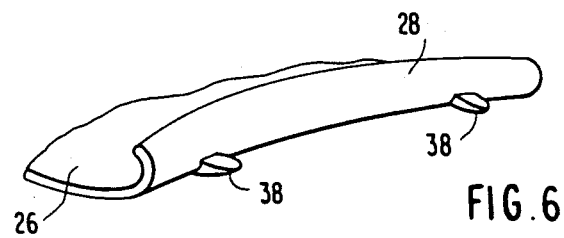
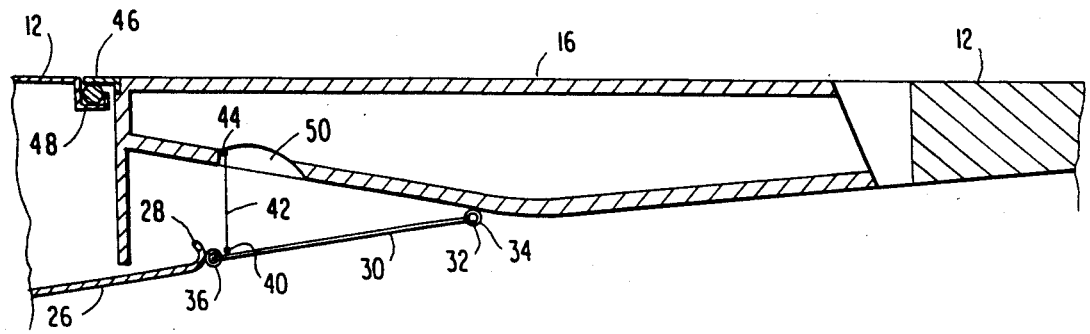
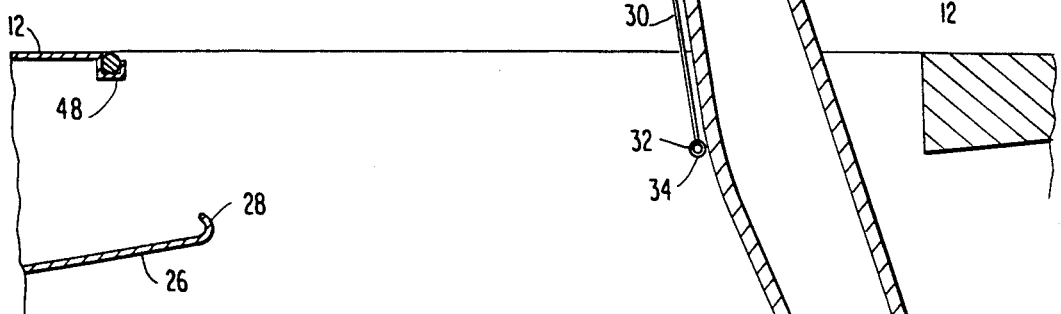

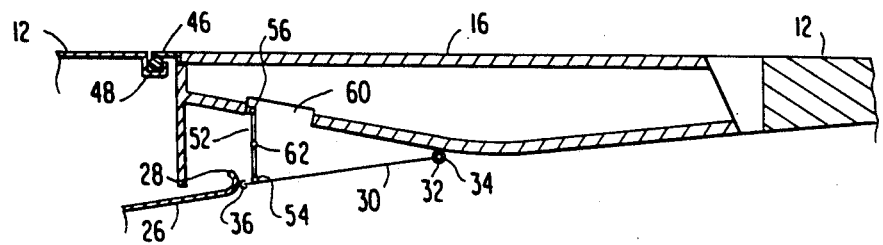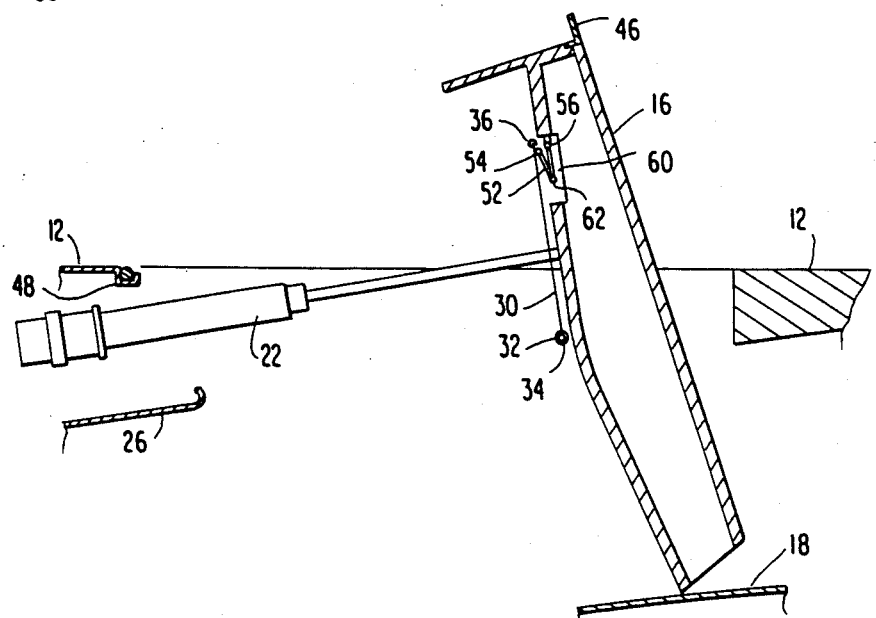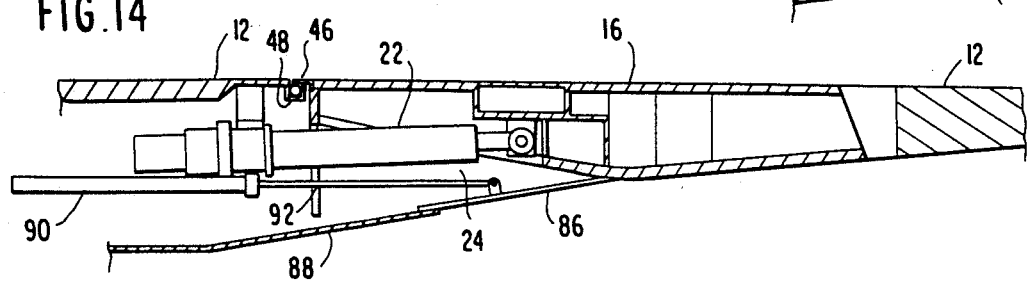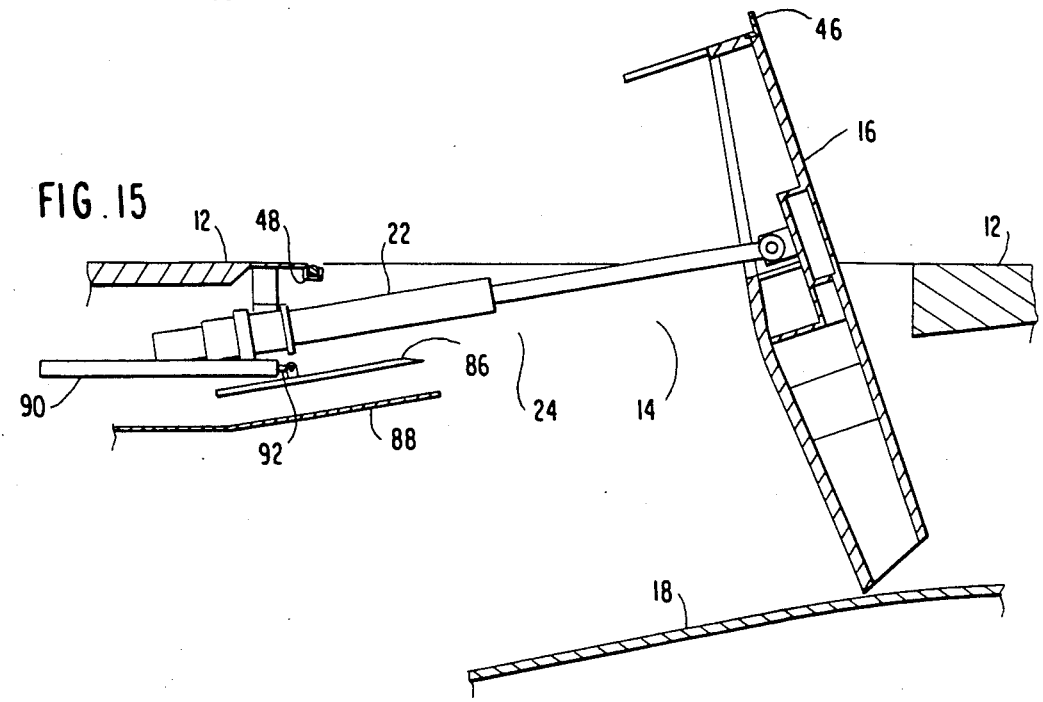

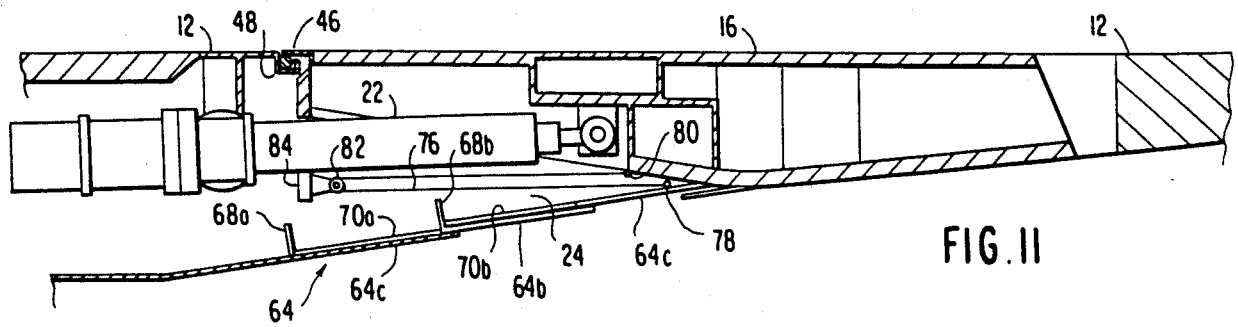
FIG.11
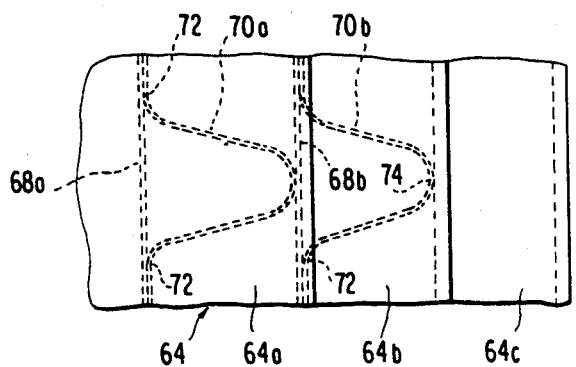
FIG.13
FIG.12
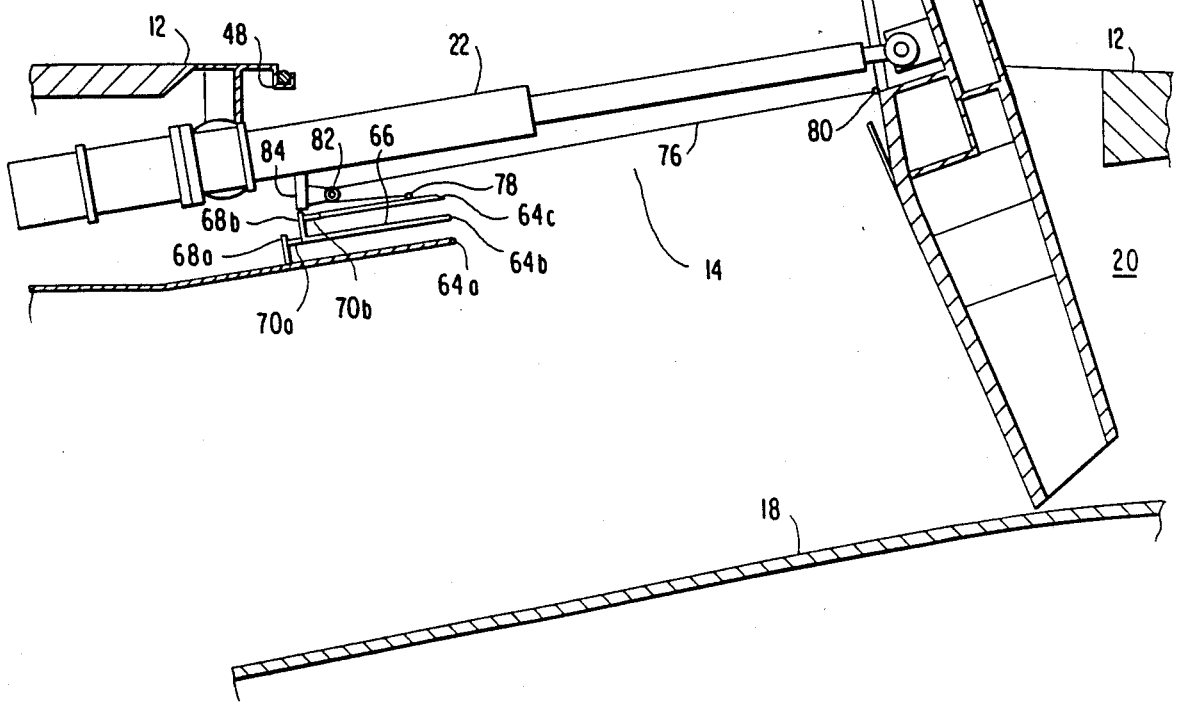

THRUST REVERSER FOR HIGH BYPASS TURBOFAN ENGINE

BACKGROUND OF THE INVENTION

1. Field of the Invention

This invention relates to gas turbine engines for aircraft and more particularly to such engines which include a bypass duct between an outer wall or nacelle and the center body of the core engine and which include blocker doors for diverting air from the bypass duct for thrust reversal.

2. Description of the Prior Art

A conventional thrust reverser for high bypass turbofan engines employs a cascade configuration covered by blocker doors when the thrust reverser is not in use, that is, during normal operation of the engine. These conventional thrust reversers have a disadvantage in terms of excess weight. The art has sought to overcome this deficiency by providing lighter weight blocker doors for thrust reversal in order to improve efficiency and to facilitate movement of the doors between normal and thrust reversal position. Unfortunately the development of such doors, while accomplishing the initial objectives just discussed, has introduced other disadvantages, particularly that the lighter weight door approach has resulted in pits on the inner surface which cause pressure drops in the exhaust flowpath during normal operation and result in a specific fuel consumption loss. Further the turbulence developed in this pit area has provided a potential noise source and this runs contra to one of the desired objectives of modern aircraft engines, namely, the reduction in noise of such engines.

The present invention retains the benefits of such lighter weight doors but eliminates the disadvantages of the aforementioned pits by providing arrangements for automatically covering the pits when the blocker doors are in the position they occupy during normal operation of the engine, that is, when forward thrust is desired. Further, this benefit is achieved without sacrificing the desired light weight construction of the blocker doors or interfering with the efficient movement of the doors between the normal and thrust reversal positions or significantly reducing flow of air along the blocker doors during thrust reversal operation.

Accordingly, it is an object of this invention to provide a thrust reverser for a gas turbine engine which employs light weight blocker doors for thrust reversal and which provides arrangements for covering the pits present in such light weight doors when the doors are in the position for normal operation of the engine, thereby minimizing pressure drop in the bypass duct during such normal operation and improving specific fuel consumption.

SUMMARY OF THE INVENTION

In carrying out this invention, in one form thereof, a thrust reverser is provided for a gas turbine engine which includes a bypass duct between an outer wall or nacelle and the center body of the core engine. The thrust reverser includes a plurality of circumferentially displaced blocker doors which are pivotally mounted adjacent the outer wall for movement between a normal position generally in line with the outer wall and a thrust reversal position in which the doors extend transversely of the bypass duct. The blocker doors are pivotally mounted adjacent openings in the outer wall through which the bypass duct air is directed during thrust reversal operation. Being of light weight construction the blocker doors include pits on the inner portion of the doors, that is the portion facing the bypass duct during normal operation of the engine. These pits are disadvantageous because they result in an undesirable pressure drop in the bypass duct during normal operation and because they are a potential source of noise during such operation. In accordance with the present invention, provision is made for automatically covering the pits during normal operation to provide smooth, non-turbulent flow of air through the bypass duct. Further this is accomplished without adding significant weight to the overall structure. In one embodiment of this invention a pit cover is pivotally mounted on the blocker door and is biased to engage the edge of a ramp fairing when the blocker door is in the position it occupies during normal operation of the engine. During thrust reversal, the pit cover moves outwardly along with the blocker door and away from the ramp fairing so as not to impede in any way flow of thrust reversal air through the opening in the outer wall. The flow of thrust reversal air across the face of the door during thrust reversal operation presses the pit cover against the door in opposition to the aforementioned bias. In a modified form of the invention, the pit cover is constructed so as to be movable between an extended position where it covers the pit during normal operation of the engine and a retracted position where it does not impede the flow of air through the opening in the outer wall during thrust reversal operation. In another modified form of the invention a hydraulically-actuated pit cover is arranged to move between a retracted position behind the ramp fairing and a position in line with the ramp fairing and covering the pit.

BRIEF DESCRIPTION OF THE DRAWINGS

For a better understanding of the invention reference may be made to the accompanying drawings in which:

FIG. 4 is an enlarged detail of a portion of the structure of FIG. 2, illustrating details of the pit cover and ramp fairing.

FIG. 5 is an enlarged sectional view of portions of the ramp fairing and pit cover illustrating a stop for limiting movement of the pit cover during normal operation.

FIG. 6 is a perspective view of the end of the ramp fairing further illustrating the construction of the stops.

FIG. 7 is a sectional view of showing a modified arrangement for limiting inward movement of the pit cover.

FIG. 8 is a view similar to FIG. 7 showing the blocker door and pit cover in the thrust reversal position.

FIG. 9 illustrates a modified form of this invention similar to FIG. 7 but incorporating a different structure for limiting the inward movement of the pit cover during normal operation.

FIG. 10 is a view similar to FIG. 9 but showing the blocker door and the pit cover in the thrust reversal positions.

FIG. 11 shows another modified form of this invention with the components in the position occupied during normal operation of the engine.

FIG. 12 is a view similar to FIG. 11 but showing the components in their thrust reversal positions.

FIG. 13 is a plan view of a portion of the retractable and extendable component of FIGS. 11 and 12, illustrating further details of the pit cover.

FIG. 14 shows another modified form of this invention with the pit cover in the position it occupies during normal operation.

FIG. 15 is a view similar to FIG. 14 with the pit cover in the position it occupies during thrust reversal operation.

DESCRIPTION OF THE PREFERRED EMBODIMENTS

Figure 1:
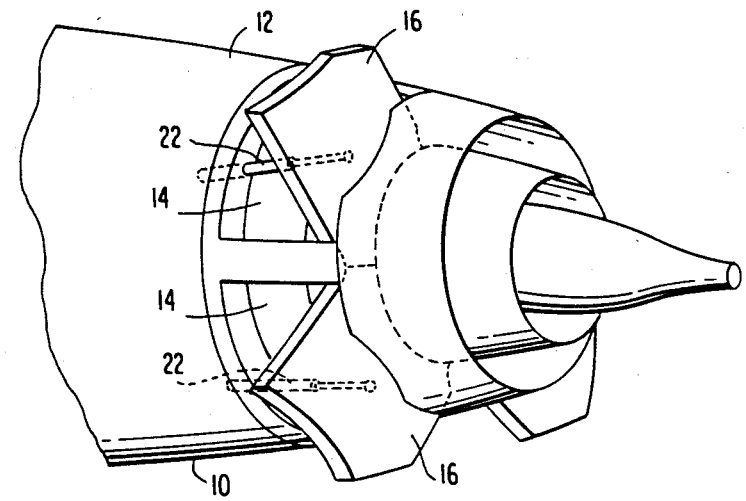
FIG. 1 is a perspective view of a portion of a gas turbine engine according to this invention, showing the blocker doors in the thrust reversing position.

Referring to FIG. 1, there is shown in perspective, with structural details omitted, the rear end of gas turbine engine embodying the thrust reverser of this invention. As there shown, the engine 10 includes an outer wall or nacelle 12. A plurality of openings 14, four in the embodiment shown, are provided in the nacelle for passage of bypass air in the thrust reversing operation. A plurality of blocker doors 16 are provided for effecting the thrust reversal. In the embodiment shown, four blocker doors are employed, one for each of the openings 14.

Figure 2:
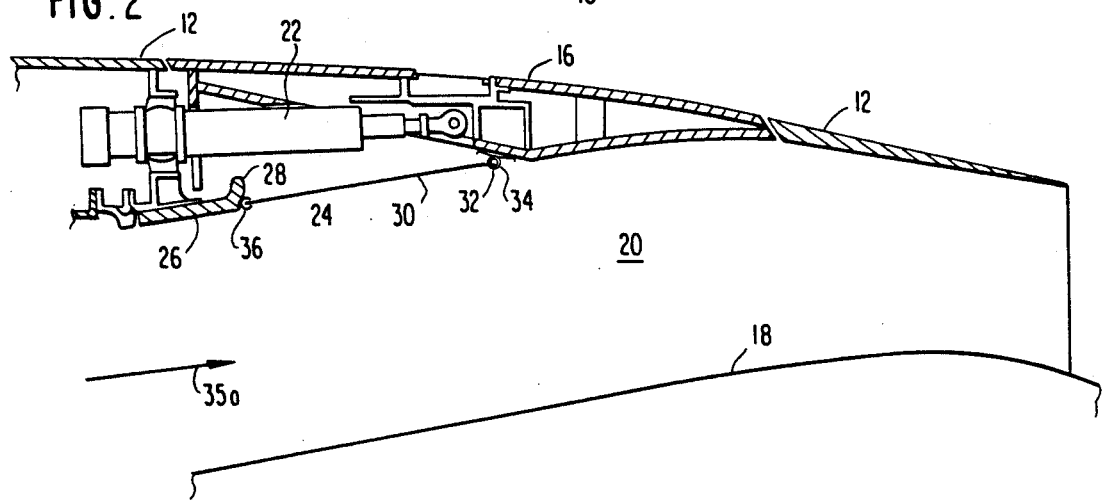
FIG. 2 illustrates details of the thrust reverser of this invention showing a blocker door and pit cover in the position occupied during normal operation of the engine.
Figure 3:
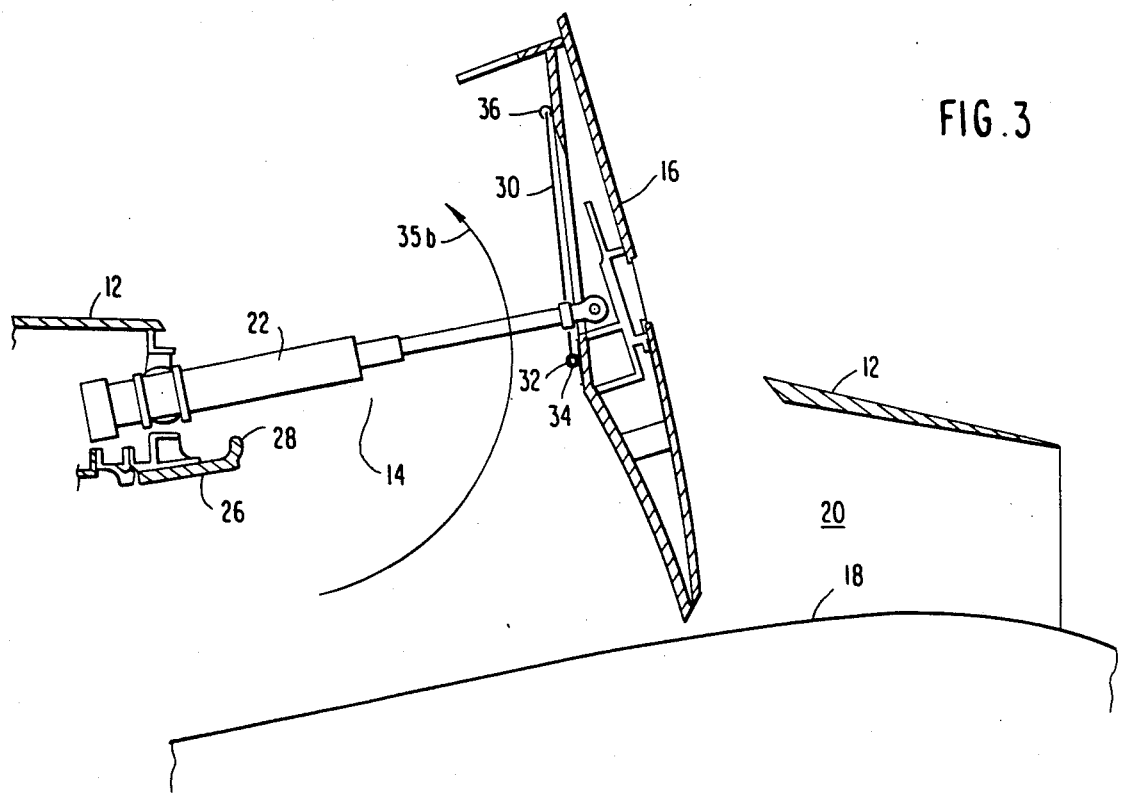
FIG. 3 is a view similar to FIG. 2 but showing the blocker door in the thrust reversing position.

A first preferred embodiment of this invention is shown in FIGS. 2, 3 and 4. Referring to FIGS. 2 and 3 there is shown in more detail a portion of the engine and the thrust reverser structure. As shown in FIG. 2, the gas turbine engine includes a center body 18 enclosing the core engine. The outer wall or nacelle 12 is spaced from the center body providing a bypass passage 20 for flow of air from the fan to the exhaust of the engine.

The blocker door 16 is shown in FIG. 2 in the closed position which it occupies during normal operation of the engine and in FIG. 3 deployed in the position it occupies during thrust reversal operation. The door 16 is moved between its two positions by a hydraulic actuator 22. The actuator employed may be any conventional type of actuator for moving blocker doors between the closed and thrust reversal positions. Since the structure of this actuator is conventional and does not constitute part of the present invention, details of illustration and description thereof have been omitted.

The blocker door 16 is of light weight construction, and this construction leaves a pit 24 adjacent the bypass passage 20 in the closed position of the door. Absent the structure of this invention, this pit, being in communication with the bypass passage, has been found to be the cause of pressure drops in the range of 0.3 to 0.5% Delta P/P, and this can be translated into a 0.5 to 1.0% specific fuel consumption loss, that is a decrease in efficiency. In addition, the turbulence resulting from the presence of the pit in the exhaust flowpath through the passage 20 is a potential noise source, and one of the objectives in design of aircraft engines is to minimize noise to the extent possible.

In accordance with the present invention, a pit cover is provided which automatically covers the pit 24, blocking communication with the passage 20 during normal operation of the engine and thereby avoiding the decrease in efficiency and increase in noise referred to above. Further, in accordance with this invention, the pit cover is arranged so that it not only provides for smooth flow of air through the bypass passage 20 during normal operation of the engine but does not in any way interfere with the full flow of air through the openings 14 during the thrust reversal operation. The structure in this embodiment of the invention includes a ramp fairing 26 mounted near the forward end of each opening 14 and having a curved rear end 28. A pit cover 30 is mounted at its rear end on the blocker door by means of a hinge 32. The pit cover is biased toward the position shown in FIG. 2 by means of a coil spring 34 mounted about the hinge 32.

As shown in FIG. 2, during normal operation of the engine the forward end of the pit cover engages the curved portion 28 of the ramp fairing 26 and covers the pit 24, blocking communication between this pit and the bypass passage 20. The cover thereby eliminates the aforementioned problems of loss of efficiency and increase in noise. The direction of air flow during normal operation is indicated by the arrow 35a in FIG. 2.

Referring now to FIG. 3, where the blocker door 16 is shown in its thrust reversal position, it can be seen that the pit cover 30 is completely clear of the opening 14 and therefore does not impede in any way the full flow of thrust reversal air through the opening 14 during the thrust reversal operation. As shown in FIG. 3, the air flowing through the opening 14 easily pushes the pit cover 30 into a position flush against the face of the blocker door against the bias of the spring 34, thereby removing the pit cover completely from the path of the thrust reversal air flowing through the opening 14. The direction of air flow in the thrust reversal position is indicated by the arrow 35b in FIG. 3.

When the blocker door 16 is moved again to the closed position shown in FIG. 2 for normal operation of the engine, the pit cover is brought, by means of the bias of the spring 34, into engagement with the curved end 28 of the ramp fairing 26, as shown in FIG. 2. To facilitate movement of the forward end of the pit cover to the position shown in FIG. 2 and past the curved end 28 of the ramp fairing 26, the pit cover is provided at its forward end with a bumper 36 as shown in more detail in FIGS. 4 and 5. This bumper is made of flexible deformable material which enables the forward end of the pit cover to move along the curved edge 28 of the ramp fairing into the position shown in FIG. 2 where it provides a smooth path for flow of bypass air through the passage 20.

In order to limit the inward movement of the pit cover under the bias of spring 34 during normal operation of the engine, the ramp fairing 26 is formed, as shown in FIGS. 5 and 6 to include projecting stops 38. Under the bias of the spring 34 the end of the pit cover is moved past the curved end 28 of the ramp fairing, the bumper 36 deforming to permit movement past the curved end 28 of the ramp fairing. However, inward movement of the pit cover beyond the position shown in FIGS. 2 and 5 is precluded by engagement of the bumper 36 with the stops 38. As can be seen from FIGS. 2 and 5, in this position the pit cover is aligned with the ramp fairing and with the adjacent position of wall 12 to provide smooth flow of bypass air thereover during normal operation.

In the specific embodiment illustrated in FIGS. 5 and 6, two spaced stops 38 are employed. If desired, however, a single stop centrally disposed on the end 28 of the ramp fairing may be employed, the stop being made somewhat longer than the stops 38 shown in FIG. 6 to provide stable contact for the free end of the pit cover. Alternatively, if desired, more than two spaced stops may be employed.

A modified arrangement for limiting the inward movement of the pit cover is shown in FIGS. 7 and 8. In this embodiment the free end of the pit cover is connected, at 40, to one end of a flexible cable 42. The other end of the flexible cable 42 is connected, at 44, to the blocker door 16. In the closed position of the blocker door, shown in FIG. 7, a flange 46 thereof engages a stationary member 48 of the engine mounting structure to limit the inward movement of the blocker door. The bias of the spring 34 causes the pit cover to be moved inwardly past the curved end 28 of the ramp fairing 26 to the position shown in FIG. 7. This inward movement is limited by the flexible cable 42, as shown in FIG. 7, so that the pit cover occupies the proper position for smooth flow of bypass air during normal operation. When the blocker door is moved to the thrust reversal position shown in FIG. 8, the flexible cable folds into a recess 50 formed in the blocker door so that the pit cover can move into a position flush with the face of the blocker door for smooth flow of thrust reversal air thereover.

In lieu of the flexible cable employed in the embodiment of FIGS. 7 and 8 to limit inward movement of the pit cover, a folded lever arrangement shown in FIGS. 9 and 10 may be employed. Referring to these figures, instead of the flexible cable 42, a hinged lever 52 may be employed between the free end of the pit cover 30 and the blocker door 16. One end of the lever 52 is connected to the free end of the pit cover 30 by any suitable hinge 54. The other end of the lever 52 is similarly connected to the blocker door by means of a hinge 56. To permit folding of the lever into a position within a recess 60 in the blocker door in the thrust reversal position, as shown in FIG. 10, the lever 52 is made in two parts hinged at the center at 62. As shown in FIG. 9, during normal operation when the pit cover is biased inwardly by a spring 34 (see FIG. 2), the inward movement is limited by the length of the lever 52 so that the pit cover is positioned in line with the ramp fairing 26 and the wall 12 to cover the pit in the blocker door and to provide for smooth flow of air through the passage 20. In the thrust reversal position shown in FIG. 10, the pit cover 30 is moved flush against the face of the blocker door 16 against the bias of the spring 34 by the thrust reversal air flowing over the pit cover. In this mode of operation the two parts forming the lever 52 are folded within the recess 60, as shown in FIG. 10.

A further modified form of this invention is shown in FIGS. 11, 12 and 13. In lieu of the pit cover engaging the end of a stationary ramp fairing, as in the embodiment of FIGS. 2-4, the embodiment of FIGS. 11, 12 and 13 employs an extensible and retractable ramp fairing 64. The ramp fairing 64 is shown in FIG. 11 in the extended position which it occupies during normal operation of the engine. In this position the ramp fairing substantially covers the pit 24 and provides a surface for smooth flow of air through the bypass 20.

When the thrust reversal operation is initiated the ramp fairing is retracted to the position shown in FIG. 12 where it is substantially clear of the opening 14 and does not impede the flow of air therethrough, thereby providing a fully effective thrust reversal operation.

The structure of this embodiment is shown in further detail in FIG. 13. As shown in FIG. 13, the ramp fairing 64 includes a plurality of segments (three is the specific embodiment illustrated) 64a, 64b and 64c. Each of the segments 64a, 64b and 64c is formed to include a flat portion 66 and the segments 64a and 64b include flanges 68a and 68b, respectively, extending upwardly at one end of the portion 66. The segments 64b, and 64c are biased toward the extended position shown in FIGS. 11 and 13 by means of springs 70a, 70b. The ends 72 of each spring 70a, 70b are connected to the flange 68 of one segment and the center of the spring presses against the flange 68 of the adjacent segment, as best shown in FIG. 13.

In the embodiment of FIGS. 11-13 the ramp fairing is extended by the bias of the springs 70a, 70b, during normal operation to the position shown in FIG. 11 where it covers the pit 24. In order to move the segments 64b and 64c to the retracted position shown in FIG. 12 a cable 76 is provided extending between the blocker door 16 and the segment 64c. One end of cable 76 is connected to a tab 78 extending upwardly from the top surface of segment 64c. The other end is connected to the blocker door at 80. A pulley 82 is mounted on a stationary member 84 and the cable 76 extends over this pulley. When the blocker door is moved to its thrust reversal position shown in FIG. 12, it causes the cable to move the segment 64c to the left compressing the abutting spring 70b against the flange 68b of the segment 64b and causing segment 64b to also move to the left against the bias of the spring 70a. The segmented ramp fairing is thereby retracted to the position shown in FIG. 12 providing an unobstructed opening 14 for flow of thrust reversal air. When the blocker door is moved to its position for normal operation, as shown in FIG. 11, the pull of the cable 76 on the segment 64c is released and the bias of the springs 70a, 70b causes the segmented ramp fairing to be extended to the position shown in FIG. 11, covering the pit 24 and providing for smooth flow of air through the passage 20.

In the embodiment of FIGS. 14-15, a pit cover 86 is arranged for movement between a first position, shown in FIG. 14, where it covers the pit 24 during normal operation and a second position, shown in FIG. 15, where the pit cover 86 is retracted behind the ramp fairing 88 to provide an unobstructed opening 14 for passage of thrust reversal air. In this embodiment a hydraulic actuator 90 is provided and the pit cover 86 is connected to the end of an actuator rod 92 of the actuator 90.

During normal operation the actuator rod 92 is extended, as shown in FIG. 14, to move the pit cover 86 into the position shown in FIG. 14. In this position the pit cover covers the pit 24 and is in line with ramp fairing 88 and wall 12 to provide smooth flow of air through the passage 20. During the thrust reversal operation the pit cover 86 is moved by the actuator 90 to the position shown in FIG. 15. In this position the pit cover 86 is disposed behind the ramp fairing 88 so that an unobstructed opening is provided for the flow of thrust reversal air through the opening 14.

It is claimed:

1. A thrust reverser for a gas turbine engine of the type which includes an outer wall spaced from the center body of a core engine to define a bypass duct therebetween, said thrust reverser comprising:

(a) a plurality of circumferentially displaced blocker doors, each of said doors being movable between a normal position generally aligned with said outer wall and a thrust reversing position extending transversely of said bypass duct for blocking the exhaust of air through said bypass duct and directing the air through an opening in said outer wall for thrust reversal;
(b) each of said blocker doors being of lightweight construction and including a pit in the inner surface thereof in said normal position;
(c) means for covering said pit during normal flow of air through said bypass duct to reduce the pressure drop in said bypass duct and to reduce noise;
(d) said covering means including a pit cover hingedly mounted at one end thereof on said blocker door; and
(e) means for biasing said pit cover away from said blocker door to a position providing smooth flow of air through said bypass duct during normal operation.

2. The thrust reverser as recited in claim 1 wherein said covering means further comprises
a ramp fairing disposed substantially at the forward end of said opening so as to engage the other end of said pit cover to cover said pit in the normal position of the blocker door.

3. The thrust reverser as recited in claim 3 wherein said hinged mounting includes
a hinge at said one end of said pit cover for movement of said pit cover relative to said blocker door.

4. The thrust reverser as recited in claim 3 wherein:
(a) said hinge comprises a hinge pin connecting said one end of said pit cover to said blocker door; and
(b) said biasing means comprises a coil spring mounted on said hinge pin.

5. The thrust reverser as recited in claim 3 wherein said hinge is disposed at the rear end of said pit cover and in the thrust reversal portion of said blocker door said pit cover is urged into engagement with said blocker door against the bias of said biasing means by the air flowing over said blocker door.

6. The thrust reverser as recited in claim 2 wherein:
(a) said ramp fairing includes a curved rear end;
(b) said other end of said pit cover includes a deformable bumper; and (c) said bumper is capable of being deformed to permit said pit cover to move along the rear end of said fairing under the influence of said biasing means as said blocker door returns to its normal position.

7. The thrust reverser as recited in claim 2 and further including means for limiting movement of said pit cover under the influence of said biasing means during normal operation of the engine.

8. The thrust reverser as recited in claim 7 wherein said limiting means comprises a stop on said rear end of said ramp fairing engageable by said cover.

9. The thrust reverser as recited in claim 7 wherein said limiting means comprises:
(a) a flexible cable;
(b) said flexible cable having one end connected to said pit cover and the other end connected to said blocker door;
(c) said cable being of a predetermined length such that when said blocker door is in its position for normal operation the length of said cable limits movement of said pit cover to a position providing smooth flow of bypass air through said duct.

10. The thrust reverser as recited in claim 10 and further including a recess formed in said blocker door, said cable being received in said recess during thrust reversal operation.

11. The thrust reverser as recited in claim 7 wherein said limiting means comprises:
(a) a lever connected at one end to said blocker door and at the other end to said pit cover for limiting movement of said pit cover in a direction away from said blocker door during normal operation;
(b) said lever being formed in two parts hinged to permit folding of said lever when said pit cover is moved to its position adjacent said blocker door during thrust reversal operation.

12. The thrust reverser as recited in claim 11 and further including a recess formed in said blocker door, said lever in its folded position being received in said recess.

* * * * *